Patented May 26, 1931

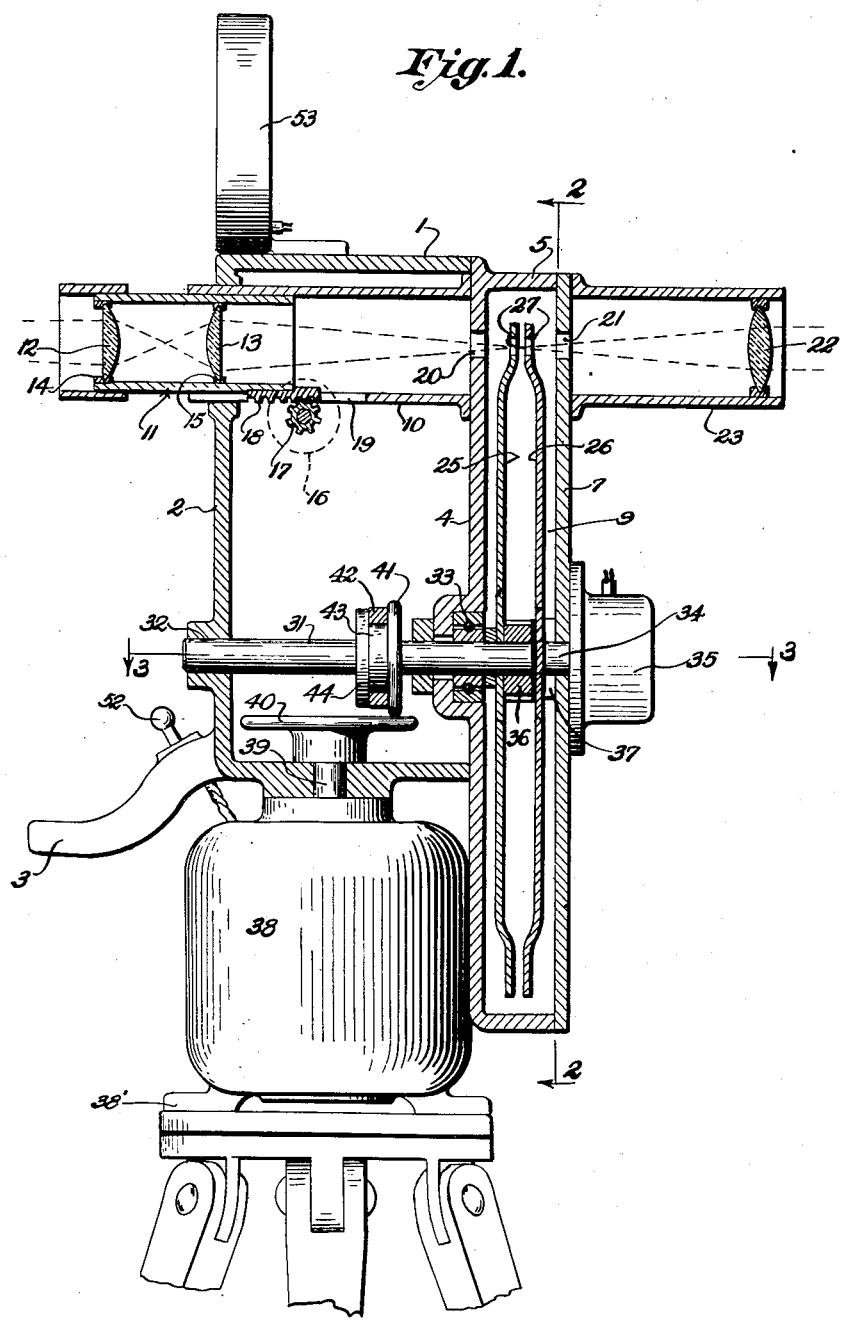

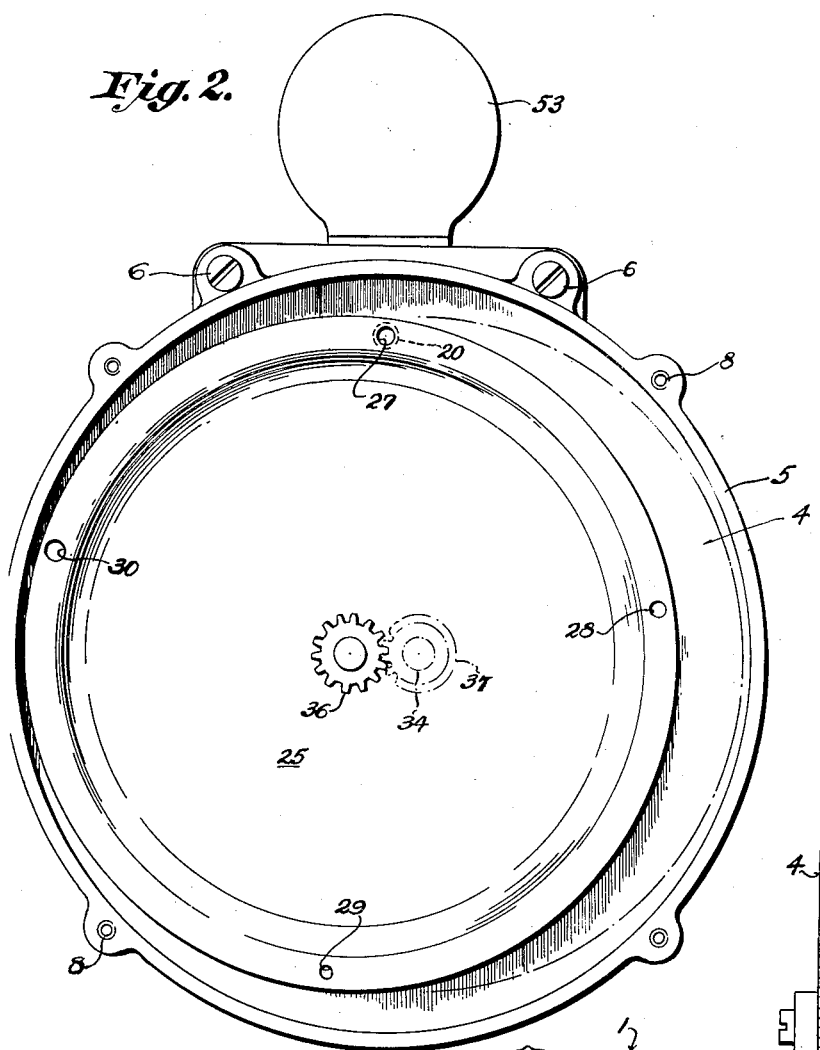
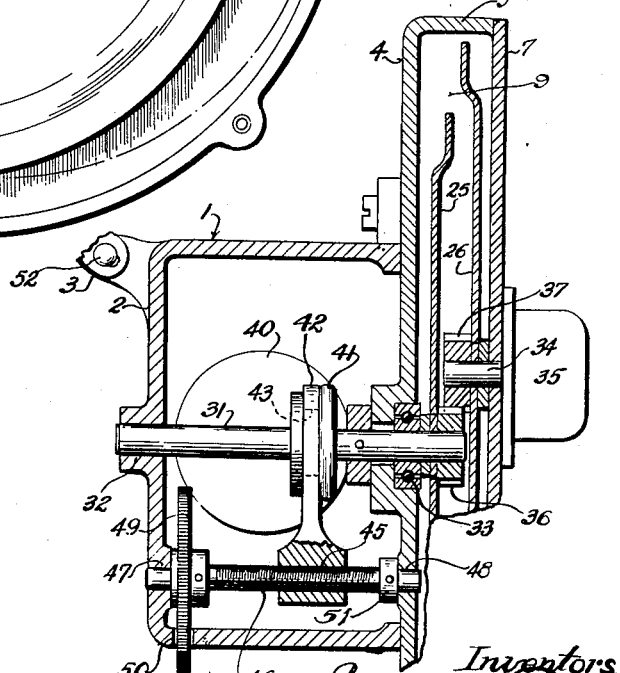

1,807,149

UNITED STATES PATENT OFFICE

EDWARD A. BUTLER, OF BUFFALO, AND THEODORE R. OLIVE, OF NEW YORK, N. Y., ASSIGNORS, BY MESNE ASSIGNMENTS, TO ROBERT DONNER, OF BUFFALO, NEW YORK

STROBOSCOPIC APPARATUS

Application filed May 26, 1928. Serial No. 280,805.

This invention relates to stroboscopes or devices for measuring or determining the speed of rotation or movement of moving objects and for studying the variations in movement thereof.

In devices heretofore proposed to serve the purpose of this invention, there have been provided means for illuminating the object to be observed, together with a rotating disk or the like having an aperture therein, and means for driving the disk whereby the aperture will come into registration or line with the eye of the observer with a predetermined frequency. There have also been provided devices of the so-called neon type in which generally a magneto provided with a tachometer supplies high frequency alternating current to a neon lamp the light from which is directed upon a moving object. The speed of the magneto is regulated by means of a suitable change speed device interposed between it and the motor until the frequency of the current generated thereby and the light beam coincide with the cyclic frequency of movement of the object under observation. Under such conditions the object appears to be stationary and the rapidity of motion of the object is indicated by the tachometer.

The disadvantage of these types of structure has been lack of accuracy in the reading of the cyclic frequency offered. With respect to the first-mentioned type definite and accurate readings have been impossible at certain speeds due to the fact that an immediate and abrupt cutting off or interruption of the light beam does not take place. Furthermore, these devices have been limited in their application due to the fact that the rotating disk has one standard sized opening which can be used only at certain speeds and on certain classes of work. With respect to the second class of devices, that is to say the neon type, it has been found that there is an inherent and variable error by reason of the well known physical fact that the intervals of darkness between the intervals of light are of irregular and uncertain duration at high frequencies, and inasmuch as it is essential for accuracy that both of these intervals be relatively accurate, this type of device is not reliable over a range of variable speeds.

One object of the present invention is to provide a device of the character referred to which is of relatively simple construction, readily portable and which is susceptible of ready use by the millwright and factory engineer as well as by research and more technically trained persons.

A further object is to provide a device which will be substantially universal in its application and permit of a wide variety of uses and observations such as examining shafts, gears, cams, shuttles and the like, or any body having a high cyclic frequency whether rotary, reciprocatory or oscillatory and is equally applicable in disclosing conditions of unbalance in cyclic moving masses and the points and speeds where such unbalance occurs.

Another object is to provide a variable means for indicating the results of the observation which are not subject to the errors heretofore complained of.

Further objects will appear in the following specification and claims.

In the drawings:

Fig. 1 is a vertical longitudinal section through the device.

Fig. 2 is a view taken on the line 2—2 of Fig. 1 with the cover plate removed and illustrating the relative eccentricity of the interrupters or frequency changing elements, and Fig. 3 is a fragmentary transverse sectional view taken on the line 3—3 of Fig. 1 and illustrating the mechanism for driving the interrupters and for varying the speed thereof.

Referring to the drawings, the device is shown as comprising a housing 1 formed with a rear wall 2 and provided with a handle 3 by means of which the device may be carried about and sighted in any direction. A circular plate 4 having a forwardly extending peripheral flange 5 is detachably secured to the housing 1 by screws 6 and to the flange 5 of this plate a circular cover plate 7 is detachably secured by screws 8. The plates 4 and 7 together form a relatively narrow chamber or compartment 9, the purpose of which will hereinafter be described.

The housing 1 is also formed with a barrel portion 10 in the upper portion of the rear wall 2 thereof within which a cylindrical lens holder 11 is slidably mounted. In this holder a pair of suitable lenses 12 and 13 are fixed in proper spaced relation by means of rings 14 and 15. The holder 11 and the lenses carried thereby may be adjusted longitudinally in order to obtain the proper focus by means of a thumb nut 16 and pinion 17 which latter meshes with a rack 18. This rack is fixed to the lower side of the holder 11 and slidably engages a slot 19 formed in the barrel 10 thus also functioning as a key to prevent the holder from rotating.

The operator in using the device sights through the lenses 12 and 13, through relatively small alined openings 20 and 21 in the plates 4 and 7 respectively and then through a lens 22 at the moving object under examination. The lens 22 is fixed in a tubular member 23 which is suitably secured to the cover plate 7 of the chamber 9.

In order to obtain the necessary stroboscopic effect, a pair of oppositely rotatable interrupters or frequency changing means in the form of disks 25 and 26 are provided which are eccentrically mounted in overlapping relation within the chamber 9 and which are of sufficient diameter to extend between the sight openings 20 and 21 in the plates 4 and 7. Each of these disks is provided with a series of peripheral openings 27, 28, 29 and 30 of different sizes, (Fig. 2), which are adapted to periodically register with the sight openings 20 and 21 as the disks are rotated. The openings in each of the disks 25 and 26 are spaced varying angular distances apart so that when the disks are adjusted angularly to cause an opening of a certain size in one of the disks to register with an opening of corresponding size in the other disk in the line of vision through the opening 20, none of the other openings will register at this particular point. The openings 27, 28, 29 and 30 are of different sizes so that the range of vision may be regulated according to the speed of the object under examination or its distance from the operator or both.

The disk 25 is fixed to one end of a drive shaft 31 which projects a short distance into the chamber 9 and which is journalled in bearings 32 and 33 formed in the rear wall of the housing 1 and plate 4 of the chamber 9, and the disk 26 is fixed to one end of a rotor shaft 34 of an electric generator 35 which is secured to the exterior of the plate 7, the purpose of which will be hereinafter set forth. The disks 25 and 26 are caused to rotate at the same peripheral speed by intermeshing gear wheels 36 and 37 which are keyed to the ends of the drive shaft 31 and the rotor 34 respectively.

The disks 25 and 26 are rotated by means of a high speed electric motor 38 which is exteriorly mounted on the lower portion of the housing 1, and which is provided with suitable means 38' for attachment to a tripod if so desired. The shaft 39 of this motor extends vertically into the housing 1 and is provided at its upper end with a friction drive wheel or disk 40. This wheel is adapted to be frictionally engaged by a similar wheel 41 which is keyed for axial sliding movement on the shaft 31. The wheel 41 may be adjusted along the shaft 31 and radially toward and away from the center of the wheel 40 by means of a bifurcated member or fork 42 which engages an annular channel 43 formed in the hub 44 of the wheel 41. The other end of the member 42 is provided with an interiorly screw threaded bearing 45, (Fig. 3), for engagement with an adjustment screw 46 which is rotatably mounted in bearings 47 and 48 formed in the rear wall 2 of the housing 1 and the plate 4. The screw 46 may be rotated in order to shift the position of the wheel 41 radially with respect to the wheel 40 and to thus vary the speed of rotation of the disks 25 and 26 in a well known manner, by means of a knurled thumb wheel or nut 49 which is fixed to one end of the screw 46 and which projects through a slot 50 in the housing 1 sufficiently to be readily accessible to the operator. The screw 46 is prevented from becoming displaced axially by the thumb wheel 49 at one end and a collar 51 fixed to the screw at the other end thereof. The chamber 9 in which the disks rotate not only protects the operator from these rapidly moving parts but prevents dirt from accumulating on the disks and disturbing their dynamic balance. Also this chamber protects these parts from air currents.

The motor 38 may be connected to or disconnected from a source of electric current by a suitable switch 52 conveniently arranged on the handle 3 of the device.

The armature of the generator 35, previously referred to, is rotated at the same peripheral speed as the disks 25 and 26. As a result an alternating current is induced as the disks are rotated. The coils of the stator member of the generator are electrically connected to a suitable meter 53 which is mounted on the upper portion of the housing 1 in a position where it may be easily observed by the operator. The dial of this meter is preferably graduated so as to indicate rotations per minute of the disks 25 and 26 rather than the frequency of the current generated by the generator, thus eliminating the necessity of any mathematical calculations by the operator in determining the cyclic frequency of the object being examined.

In operation, the operator sights through the magnifying lenses 12, 13 and 22 at the object under examination, a rapidly rotating gear wheel for example, and the speed of rotation of the disks 25 and 26 then adjusted by the thumb wheel 49 and screw 46 until the object appears to become stationary. When this condition prevails, it signifies that the disks 25 and 26 are rotating in synchronism with the gear. The rotations per minute of the object under observation are then accurately indicated on the meter 53. Under such conditions, the object may be examined for flaws or defects and it may be made to appear to rotate slowly backwards or forwards by simply increasing or decreasing the speed of the disks 25 and 26 so that the entire periphery of the gear may be examined.

In the event that conditions render it necessary to employ smaller or larger openings in the disks 25 and 26, it is only necessary to remove the cover plate 7 and to rotate the disks independently of each other sufficiently to align openings therein of the desired size and then to replace the plate, the teeth of the gears 36 and 37 intermeshing in their new positions. In order to insure that the teeth of the gears will mesh accurately after such adjustment the openings in the disks are formed in definite predetermined positions relative to the gear teeth. It will be understood that the device may be provided with any suitable commercial speed counter if so desired.

From the foregoing, it will be apparent that a very rugged and efficient device is provided which will quickly and accurately indicate the cyclic frequency of an object or flaws or defects existing therein and one in which the inaccuracies, and other objections, heretofore encountered are eliminated.

The illustrated embodiment of the invention may be modified in construction and arrangement without departing from the scope of the invention, as defined in the appended claims.

What is claimed is:

1. A stroboscopic apparatus for examining rapidly moving objects and for indicating the cyclic frequency thereof comprising a pair of movable members disposed in overlapping relation with respect to each other and each having a plurality of openings of different sizes provided therein, said members being adapted to be assembled in different angular positions to selectively cause an opening of a certain size in one of said members to register with an opening of corresponding size in the other of said members at a predetermined point, means for varying the speed of movement of said members, and means for observing the object through the openings in said members at their point of registry.

2. A stroboscopic apparatus for examining rapidly moving objects and for indicating the cyclic frequency thereof comprising a pair of disks mounted for rotation in opposite directions about different spaced axes and disposed in overlapping relation with respect to each other, each of said disks having a plurality of openings of different sizes provided therein, said members being adapted to be assembled in different angular positions to selectively cause an opening of a certain size in one of said members to register with an opening of corresponding size in the other of said members at a predetermined angular position, means for varying the speed of rotation of said members, and means for observing the object through the openings in said members at their point of registry.

3. A stroboscope comprising a relatively thin cylindrical casing, a rotatable disc formed with apertures mounted in said casing, aligned apertures formed in the end walls of said casing having a common axis adapted to be periodically aligned with the axis of the apertures in the disc when said disc is rotated, a relatively long cylindrical casing projecting from said relatively thin casing in alignment with said common axis, observing lenses mounted in said long casing, means for adjusting said lenses with respect to the apertures in said thin casing and rotatable disc, means for rotating said disc, means for varying the speed of rotation thereof, a tachometer positioned over said long casing adjacent the eye piece of the lenses, and means operated by the rotation of said disc for actuating the tachometer.

4. A stroboscope comprising a housing, a casing mounted thereon, a drive shaft mounted in said housing and having an end extending into said casing, a disc mounted on said shaft in said casing, a drive gear secured to said shaft in said casing, a cover removably secured to said casing, a stub shaft rotatably mounted on said cover and extending into said casing, a disc mounted on said stub shaft, and a driven gear secured to said stub shaft and meshing with said drive gear for actuation thereby, each of said discs having peripheral openings adapted to periodically register as the discs are rotated.

EDWARD A. BUTLER.
THEODORE R. OLIVE.